United States Patent Office 2,750,628
Patented June 19, 1956

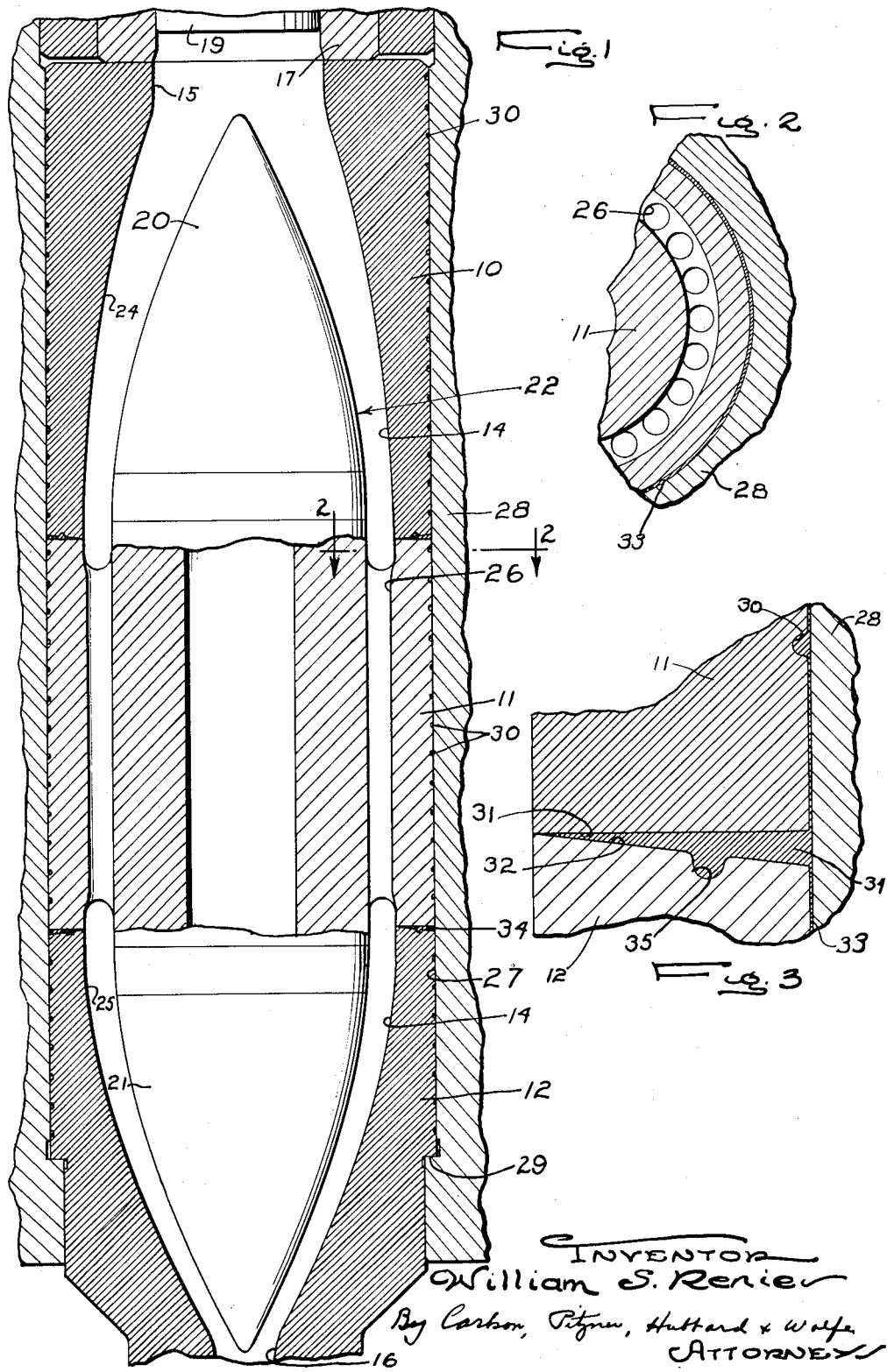

2,750,628

HEATING UNIT FOR PLASTIC MOLDING MACHINES

William S. Renier, Fond du Lac, Wis., assignor to Giddings & Lewis Machine Tool Company, Fond du Lac, Wis., a corporation of Wisconsin Application August 29, 1951, Serial No. 244,233

2 Claims. (Cl. 18—30)

The present invention relates to heating units of the type used in certain plastic molding machines to heat plastic materials to proper molding temperatures. Such units are designed to effect an even heating of the material as it is used and are formed to define a plurality of relatively small heated passageways through which the material is passed just prior to its injection into the molds. Because of the intricate configuration and arrangement of the passageways formed in each unit for this purpose, it is virtually essential from a manufacturing standpoint that each unit be fabricated from a plurality of parts which are separately formed and assembled together.

This necessity for using an assemblage of individual parts for defining the passageways in a particular heating unit has in turn been the source of various disadvantages and difficulties experienced in the operation and manufacture of the units. In particular, the junctures between the parts have had an insulating effect limiting the efficiency with which heat is transferred to the plastic material. Also, the plastic material has a tendency to seep into the joints between the parts where it deteriorates and causes corrosion of the joints. At times this material is washed out of the joints back into the passing stream of plastic material to discolor the stream and objects molded from the discolored material. Moreover, prior efforts to minimize these operational difficulties have imposed severe limitations on the dimensional tolerances permitted in the manufacture of the component parts of the unit. These limitations have entailed expensive machining operations with consequent increases in the cost of the units.

The present invention has for its purpose the overcoming of the foregoing difficulties and unfavorable characteristics previously associated with units of this type.

The general object of the invention is to accomplish the above purpose through the provision of a heating unit, the thermally conducting parts of which are intimately bonded together by a solder-like material.

Other objects and advantages will become apparent as the description proceeds.

In the accompanying drawing:

Figure 1 is a fragmentary sectional view of a heating unit embodying features of the invention.

Fig. 2 is a fragmentary sectional view taken along the line 2—2 of Fig. 1.

Fig. 3 is a fragmentary sectional view on an enlarged scale showing bonded junctures between the parts.

While the invention is susceptible of various modifications and alternative constructions, there is shown in the drawing and will herein be described in detail the preferred embodiment, but it is to be understood that it is not thereby intended to limit the invention to the form disclosed, but it is intended to cover all modifications and alternative constructions falling within the spirit and scope of the invention as expressed in the appended claims.

Referring more particularly to the drawing, the exemplary heating unit selected for the purpose of illustrating the present invention comprises a liner 10, torpedo section 11, and cylinder head 12 disposed in alined abutting relation to each other and defining a plurality of heated passageways 14 diverging from a common inlet 15 in the outer end of the liner 10 and converging to a common outlet 16 in the outer end of the cylinder head 12. Plastic stock materials are forced under pressure into the inlet 15 and through the passageways 14 by a suitable feeding mechanism.

As shown, this mechanism comprises a feeding cylinder 17 having a reciprocating ram 19 slidably disposed within a bore in the cylinder to force the materials through the unit to be discharged from the outlet 16 into molds designed to receive the plastic materials.

Referring more particularly to the configuration and arrangement of the passageways 14, it will be noted that they are, in accordance with conventional practice, designed to spread out the incoming flow of material from the inlet 15 into smaller streams which are quickly and evenly heated as they pass through the unit. For this purpose the central axial portion of the torpedo section 11 is elongated and pointed at opposite ends 20, 21 to form a torpedo 22. The opposite ends of the torpedo project into bores 24, 25 of the liner 10 and the cylinder head 12 respectively, the bores being enlarged in transverse section from their outer to their inner ends to have interior walls circumferentially spaced from the torpedo ends to define therewith the passageways 14. To permit passage of the material through the torpedo section 11, a plurality of circumferentially spaced, axial bores 26 are formed in the section 11 in radial alinement with the adjoining passages in the liner 10 and head 12 to interconnect the latter passages with each other.

Because of the shaping and arrangement of the passageways 14 thus formed, it is advantageous if not essential from a practical standpoint that the portion of the unit defining the passageways be manufactured from a number of individual parts, as shown. These parts, which include the liner 10, torpedo section 11, and head 12, are assembled into the longitudinal bore 27 of a heating cylinder 28 which is conventionally provided with heating elements (not shown) on its outer surface (not shown). In the present instance, the outer cylindrical end of the head 12 is stepped down to extend through an annular collar 29 integrally formed on the cylinder 28 to aid in initially maintaining the parts in assembled position.

In accordance with the present invention, the heat conducting parts within the heating cylinder 28 are intimately bonded to each other and to adjoining portions of the surface of the cylinder bore 27 by a solder-like bonding material. It has been found that by bonding the junctures of the parts together in this fashion, greatly simplified and leakproof abutting joints between the parts within the cylinder can be effected. Of substantially equal significance is the increased overall heating efficiency of the heating unit which is realized from the marked capability of the bonded junctures to transmit heat from the cylinder 28 to the internal parts of the unit.

Giving consideration to the elevated temperatures at which units of this type operate as well as to other factors, it is preferred that the parts be bonded together with silver solder. Initially the solder is placed in small, axially spaced, circumferential grooves 30 formed in the outer cylindrical surfaces of the liner 10, torpedo section 11, and head 12 which are to be bonded to the cylinder 28. Dimensioning of the parts is such that these contiguous surfaces to be bonded together are spaced a few thousandths of an inch from each other. After the parts are assembled together with the solder in the grooves 30, the assemblage is evenly heated until the solder melts and disperses itself to fill the thin spaces 33 between the contiguous surfaces of the parts, Fig. 2. The solder freezes upon cooling of the assembly and remains frozen to hold the parts together at the normal operating temperatures attained by the unit in subsequent plastic molding operations.

In prior constructions in which parts of the heating unit have not been bonded together there have been air gaps at the junctures between the structural components of the unit which have served as barriers to the free flow of heat. Efforts have been made to reduce the insulating effect of these gaps by reducing the size of the gaps through precise machining of the parts. However, such practices have not only unduly increased the cost of the units but they have fallen short of entirely eliminating the gaps and their detrimental effect.

It will be appreciated that the present invention permits a significant relaxation of the dimensional tolerances permitted in the machining of the opposed surfaces of the various structural elements. In any events, there is a certain amount of clearance between the cylinder 28 and the elements contained within the cylinder for accommodation of the solder. Since this clearance may vary somewhat without affecting the quality of the bond obtained, sufficient latitude is permitted in the machining of the parts to eliminate the need for expensive, high precision machining operations.

Bonding of the parts to each other as provided by the invention also permits the use of simply designed abutting joints between opposite ends of the torpedo section 11 and the liner 10 and head 12 respectively. Because of the simplicity of the joints they do not entail expensive machining of the parts joined. But despite this simplicity, they are nevertheless leakproof even to the extent that none of the plastic material can seep into the joints.

Since the abutting joint between the liner 10 and the torpedo section 11 is similar to the joint between the torpedo section and the head 12 only the latter will be described in detail. As most clearly shown in Fig. 3, the opposed annular faces 31, 32 of the torpedo section 11 and the head 12 are shaped to have mutual engagement only at the inner edges of the faces. Radially outwardly of this thin line of mutual contact the faces progressively diverge frome each other to define an annular wedge shaped space 34 between the faces. Preferably, one or the other of the abutment faces 31, 32 is axially relieved in a radially outward direction so that this face becomes, in effect, a truncated cone, the radially inward edge of which is adapted to have line contact with the opposed abutment face. As shown in the drawing the angle of divergence of the face surfaces is quite exaggerated for purposes of illustration, which exaggeration causes the size of the groove 35 to appear disproportionately small. In fact, an angle of divergence of approximately one half of one degree between the face surfaces 31, 32 is quite suitable.

This space 34 between the faces 31, 32 is filled with a wedge of silver solder which firmly bonds the faces to each other and extends radially inwardly to the line of contact between the two faces. The joint thus effected is virtually solid and is impenetrable by the plastic material with the passages 14.

The solder which fills the wedge space 34 is initially deposited in an annular groove reservoir 35 in one of the faces 31, 32 prior to assemblage of the parts with each other. The ring of solder in the groove flows from the groove into the space 34 in the same manner and at the same time that the solder flows from grooves 30 to bond the cylinder 28 to the internal heating parts within the cylinder.

As to the machining of the abutting faces 31, 32, it will be noted that in the present instance the face 31 is entirely flat and that the face 32 is slightly oblique to give the desired line contact between the faces. Both of these machining operations are quite simple and relatively inexpensive.

It may be observed that the torpedo 22 shown is hollow and that its two pointed ends are separately formed and attached to its central section. This construction is used purely for convenience in manufacture and forms no part of the present invention.

I claim as my invention:

1. A heating unit of the class described comprising, in combination, a heating cylinder defining an elongated bore therein, a plurality of alined parts disposed end-to-end in said bore along its length and defining heated passageways adapted to permit the flow of plastic materials therethrough, adjacent ends of said alined parts defining at least one pair of annular abutment faces in abutting engagement with each other, said abutting faces being shaped to have mutual line contact along their inner edges and to diverge away from each other radially outwardly of said line of mutual contact to define an annular wedge shaped space extending radially inward to said line of mutual contact, the major portion of the outer surfaces of said alined parts opposed to surfaces of said cylinder bore being formed to have the same general configuration as the facing surfaces of said cylinder bore and being disposed in slightly spaced relation to said facing surfaces; and a body of solder-like bonding material in said annular space between said pair of opposed abutment faces and in said cylinder bore between said cylinder and said alined parts and forming an integral bond between said opposed abutment faces and between said cylinder and said alined parts.

2. A heating unit of the class described comprising, in combination, a heating cylinder defining an elongated bore therein, a plurality of alined parts disposed end-to-end in said bore along its length and variously defining heated passageways adapted to permit the flow of plastic materials therethrough, the adjacent ends of said alined parts defining solder reservoirs between them, the major portion of the outer surfaces of said alined parts opposed to surfaces of said cylinder bore having the same general configuration as the opposing surfaces of said cylinder bore and being disposed in slightly spaced relation to said opposing surfaces, and a body of solder-like bonding material between said aligned parts and between said cylinder and said alined parts forming an integral bond therewith to provide high thermal conduction throughout said unit and to prevent plastic seepage between said alined parts.

References Cited in the file of this patent

UNITED STATES PATENTS

| | | |
|---|---|---|
| 582,138 | Hedenberg et al. | May 4, 1897 |
| 2,358,354 | Stacy et al. | Sept. 19, 1944 |
| 2,367,144 | Shaver | Jan. 9, 1945 |
| 2,508,988 | Bradley | May 23, 1950 |